Sept. 22, 1931. T. A. WERKENTHIN 1,824,521
PROCESS FOR SEPARATING ALCOHOLS FROM OIL
Filed Nov. 24, 1925 4 Sheets-Sheet 1
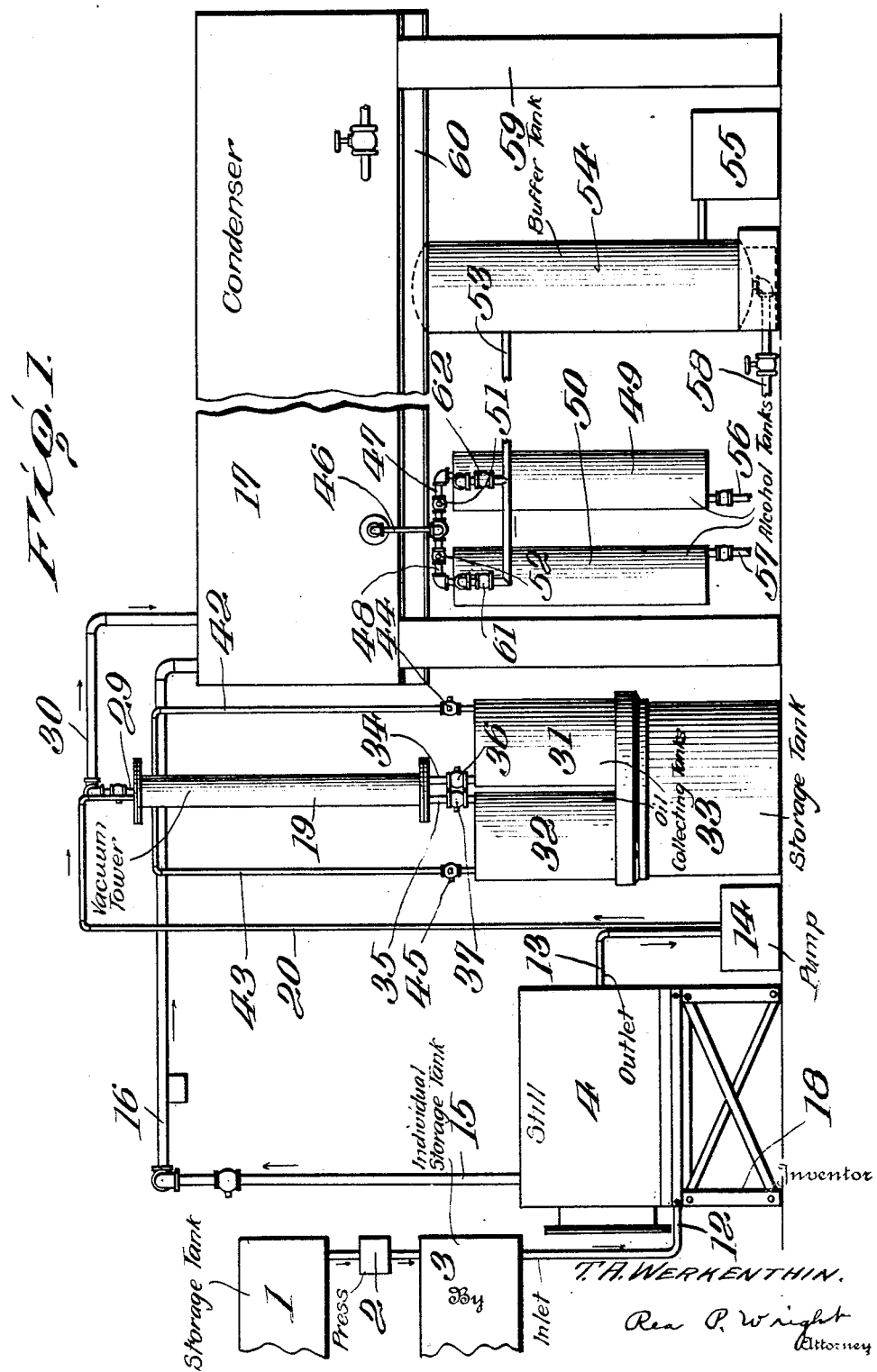

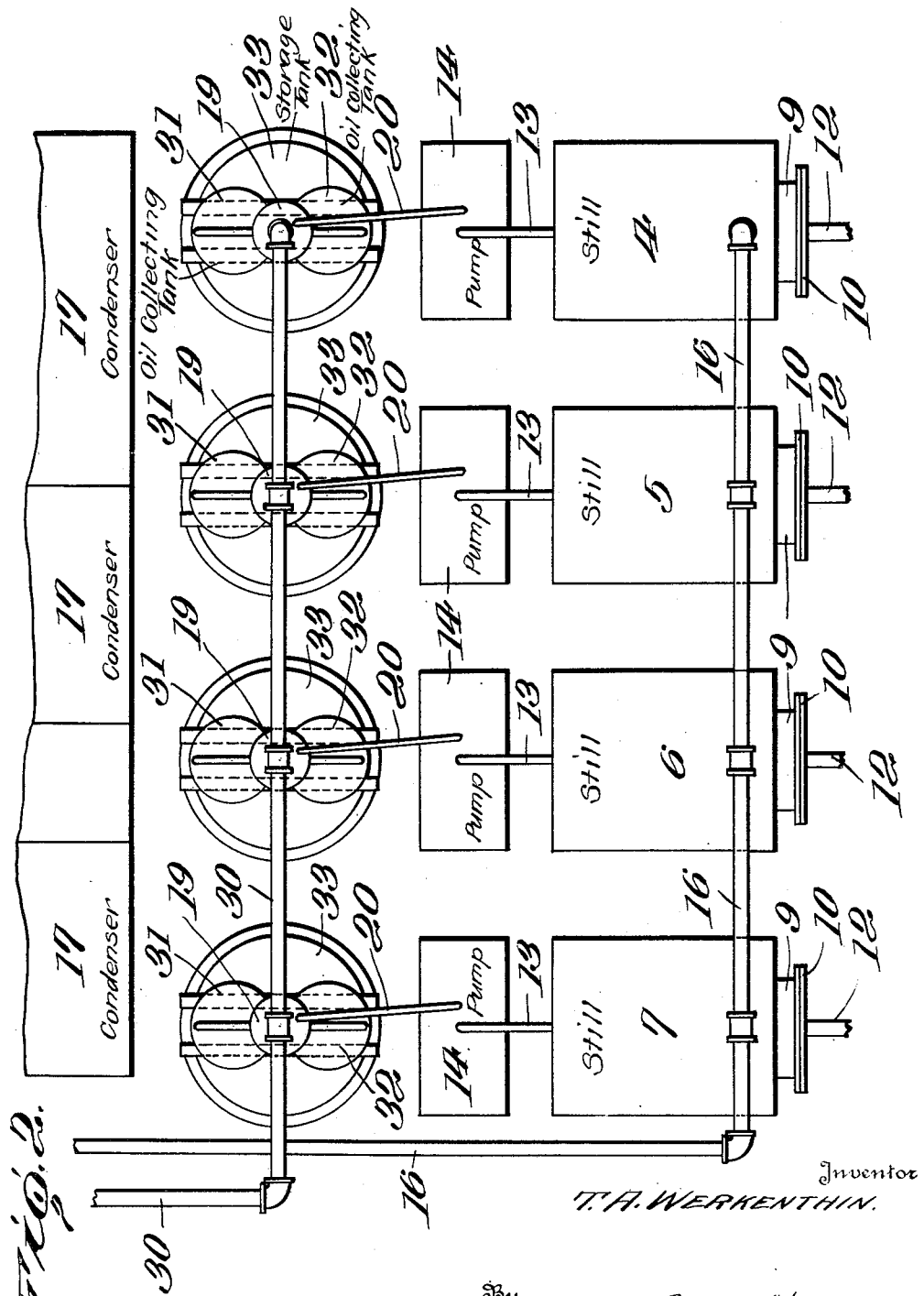

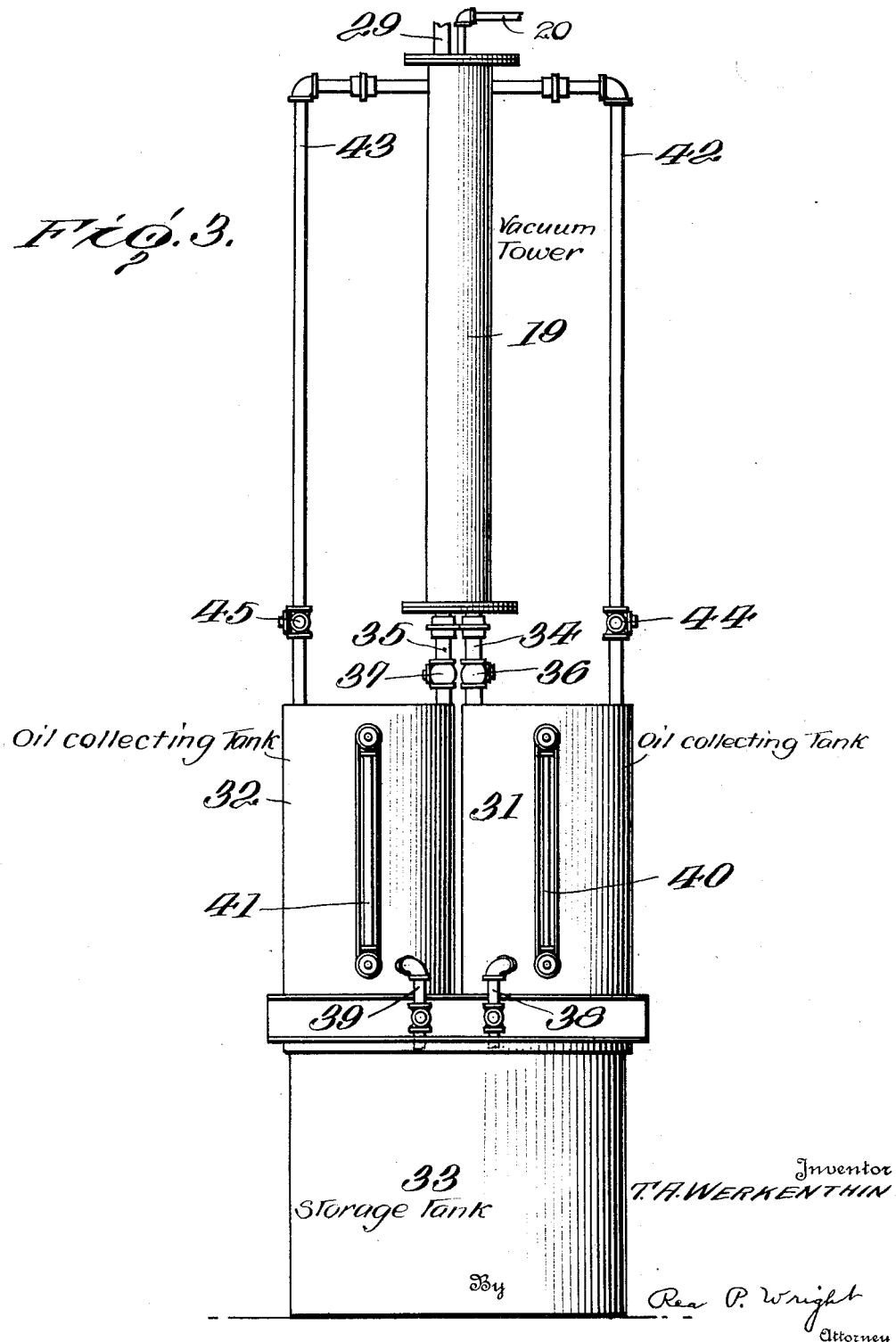

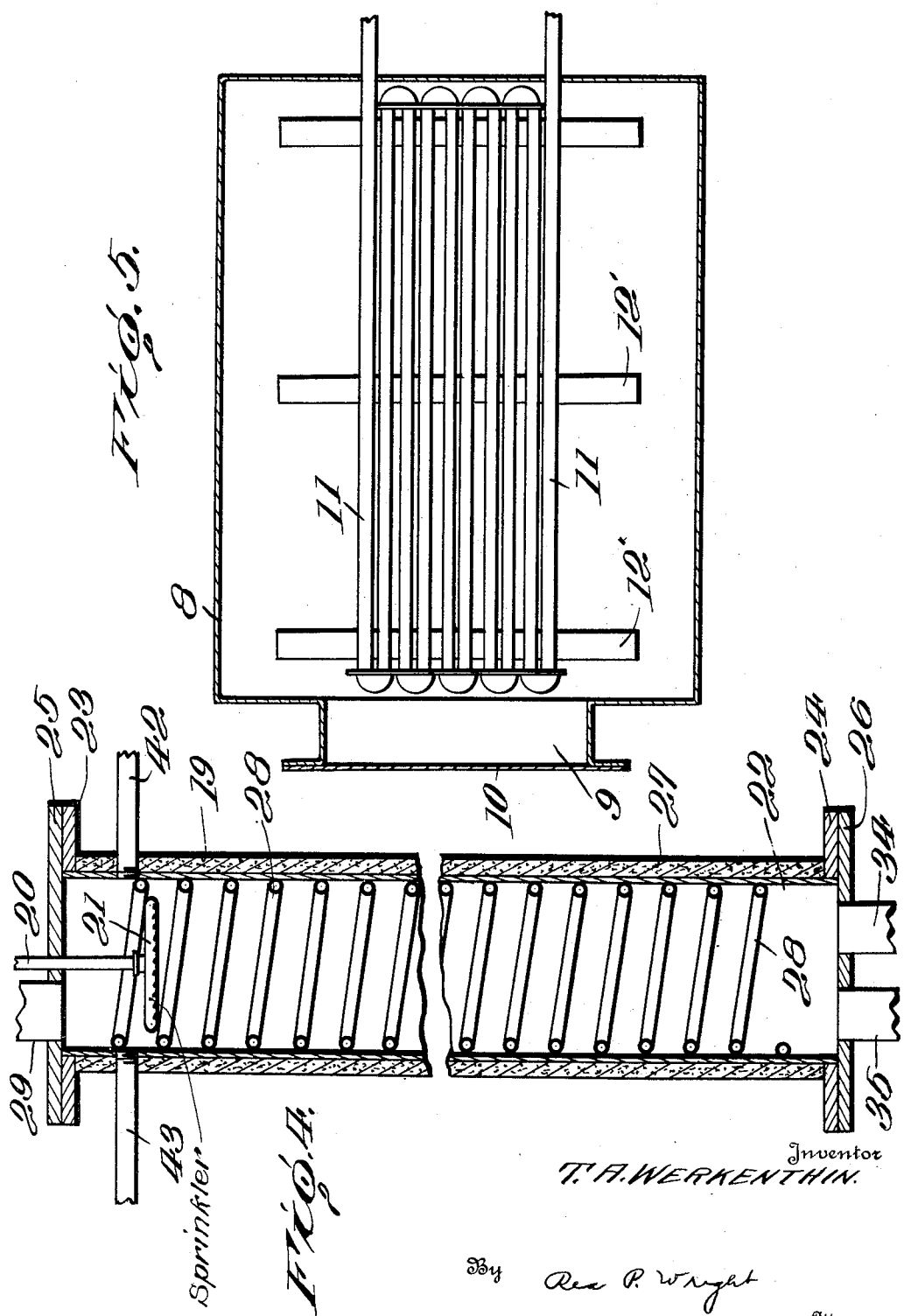

Patented Sept. 22, 1931

1,824,521

UNITED STATES PATENT OFFICE

THEODORE A. WERKENTHIN, OF LIMA, OHIO, ASSIGNOR TO THE SOLAR REFINING COMPANY, OF LIMA, OHIO, A CORPORATION OF OHIO

PROCESS FOR SEPARATING ALCOHOLS FROM OIL

Application filed November 24, 1925. Serial No. 71,112.

The present invention relates to a process for removing volatile substances from admixture with other substances of less volatility. More particularly my invention relates to a process for separating alcohols contained in admixture with hydrocarbon oils, whereby both the hydrocarbon oils and alcohols are recovered in substantially undecomposed state. Specifically, my invention relates to the separation of the small amounts of alcohol contained in the hydrocarbon oil still residues or stocks obtained in the process described in my Patent No. 1,680,352, granted August 14, 1928.

Briefly described, the process of the above referred to application comprises extracting petroleum hydrocarbons with alcohols, such as ethyl alcohol, propyl alcohol or mixtures of alcohols, by a series of treating or extracting operations and recovering by distillation the alcohols from the alcoholic extracts, thereby producing a series of still residues or stocks of hydrocarbon oils and a residuum of asphaltic or paraffin nature (depending upon the character of the starting material), having various properties. In the process specifically described in the aforementioned application four distinct alcohol extract still residues or stocks are obtained. The first still residue or stock is principally an oil which may be used as cracking stock; the second is principally a light lubricating oil; the third is principally a heavier lubricating oil; while the fourth residue or stock comprises a still heavier lubricating oil.

These four still residues or stocks contain small amounts of alcohol which have not been removed by the operations described, and it is the purpose of the present invention to provide means for the final removal of these small amounts of alcohol in a new and improved manner. The present process and apparatus does away with my method of using gas or oil fired stills; removes the fire danger arising from fired stills; provides a continuous treatment of the oils or stocks; permits of the separation of the alcohols by heating the oils or stocks to temperatures not more than 250° F. instead of 350-400° F. as in my former and other process; enables the steam heated stills to be supported on only a light structural foundation, thus saving the expense of the construction of a fire box, brick work and smokestack; saves the cost and maintenance of oil or gas burners or coal shaker grates; and does away with the contamination of the cracked naphtha by alcohol.

Furthermore, by the practice of the invention, better oils are produced, inasmuch as it will not have been exposed to the danger of over-heating or the fairly high temperatures of 350–400° F., of the prior processes, which usually result in the partial decomposition of the stocks treated. A higher viscosity oil can, therefore, be made, since a very small amount of light cracked or decomposed hydrocarbons greatly diminish the viscosity of the oil. The color of the oils is also improved by my invention, as the low carbon content of the oil stocks treated will be maintained by the low temperatures employed, practically no carbonization taking place from local superheating as in the direct fired stills.

A further advantage of the present invention consists in that smaller stills will be required for the continuously operating vacuum stills employed than for the batch or coal fired stills; and, in addition, the life of the still will be increased, as the continuous stills employed are under less strain than batch operated units, for the reason that no sudden temperature changes occur. Since the stills are, according to my invention steam heated by internal steam heating coils, the wear and tear upon the stills will be greatly less than upon gas, oil or coal fired stills. Further advantages procured by my invention will appear from a consideration of the detailed description which follows.

Stated briefly my invention contemplates heating to not more than 250° F., and preferably around 220° F., the four aforementioned oil stocks, containing small amounts of alcohol, or any one or more of these stocks, in individual steam heated stills, thereby effecting a vaporization of part of the alcohol. The alcohol vapors resulting from the individual stills are collected and thereafter condensed and recovered. In order to effect the removal of the remainder of the alcohol, the heated oil stocks are each thereafter separately subjected, while heated and in a finely divided condition, to the action of a vacuum, partial vacuum or a reduced pressure. The vapors of alcohol thereby arising are collected and condensed in a single condensing operation, while the resulting unvaporized residual oils are maintained separate, collected and constitute the final products.

Apparatus suitable for carrying out my invention is illustrated in the accompanying drawings, wherein like parts are indicated by similar reference characters, and in which:

Fig. 1 is a side elevation of the apparatus.

Fig. 2 is a plan view showing a part only of the condenser.

Fig. 3 is a side elevation of one of the vacuum towers with its two oil collecting tanks and storage tank connected to the latter.

Fig. 4 is a longitudinal section of a vacuum tower showing the heating coil and the oil spraying or dividing means.

Fig. 5 is a horizontal section of one of the steam heated stills, showing the heating coil in plan.

The four oils containing the alcohol obtained as residues from the stills of my aforementioned application are each run into a separate storage tank 1 (see Fig. 1) after which they are each cold pressed in a press 2 and thereafter run into individual storage tanks 3. The cold pressing is for the purpose of removing paraffin when paraffin base oils are treated and is preferably done at this stage in order to take advantage of the low viscosity of the oil alcohol mixture. From the individual storage tank, there being one for each of the stills hereafter described, the oil is fed to its appropriate still.

Since there are four oil stocks to be treated four stills are provided. Any number of stills may obviously be provided depending upon how many oil products or stocks are to be treated. In the apparatus shown, the four stills 4, 5, 6 and 7 are shown. In their construction these stills are identical with the exception that their sizes may vary to care for differences in the amounts of stock required to be treated. The description of the stills will accordingly be limited to one of them.

Each still comprises a casing 8 provided with a manhole 9 and cover 10 therefor. Located within the still is a steam heating coil 11 carried upon suitable supports 12'. Each still is provided with an inlet pipe 12 and an outlet pipe 13, each leading to a pump 14 situated at a level below the still. Each of the stills has an outlet 15 for alcohol vapor and each of the outlets 15 is connected with the manifold 16 leading to the condenser 17. Each of the stills is supported upon a structural support indicated generally by 18.

A pump 14 is provided for each of the four stills shown and each of the pumps leads to a separate vacuum tower 19 by means of pipes 20 shown in Figs. 1, 2, 3 and 4. Each of the pipes 20 terminates in a spraying head or other sprinkling or dividing device 21 located in the top of each of the vacuum towers 19.

Each of the vacuum towers is composed of a cylindrical casing 22 (shown in Fig. 4) provided with flanges 23 and 24. Top and bottom plates 25 and 26 are respectively secured to flanges 23 and 24. The cylindrical casing 22 is surrounded by a heat insulating medium 27, while within the casing is positioned a coiled pipe 28 adapted to carry steam.

Each of the vacuum towers 19 is provided with an outlet pipe 29 for the vapors of alcohol. The outlet pipe 29 of each of the four vacuum towers is connected with the manifold pipe 30 which leads to the condenser 17 as the manifold 16. The manifolds 16 and 30 terminate in different coils within the condenser and hence the alcohol vapors from the two sources are separately condensed and recovered.

Two oil collecting tanks 31 and 32 are provided for each of the vacuum towers. These two collecting tanks are each associated with a storage tank 33 upon which they are supported. The lower part of each vacuum tower is connected with two pipes 34 and 35 which enter through the bottom plate 26 and connect the vacuum tower with each of the collecting tanks 31 and 32. Valves 36 and 37 are provided respectively in pipes 34 and 35 for arresting and permitting flow into the collecting tanks. Each collecting tank 31 and 32 is connected with its corresponding storage tank by suitable pipe and valve connections 38 and 39. Each of the collecting tanks 31 and 32 in the four sets are provided with gauges 40 and 41 to indicate the oil level within the tanks. From the top of each of the vacuum towers lead two pipes 42 and 43. These pipes 42 and 43 lead respectively to the collecting tanks 31 and 32 for the purpose of insuring the proper flow of the oil into the collecting tanks by equalizing the pressures maintained in tanks 31 and 32 with the pressure maintained in the tower 19. A three way cock 44 is placed in each of the pipes 42, and similarly, a three way cock 45 is placed in each of the pipes 43. The three way cocks are so constructed that a passage may either be instituted between the top of the vacuum tower and the collecting tanks or between the collecting tanks and the atmosphere.

As has been indicated above the two distinct alcoholic vapors are led to the condenser 17 by means of the manifold pipes 16 and 30 connected to separate and distinct coils within the condenser casing. As will appear from the preceding description, the vapors arising from the vacuum towers pass through the pipe 30 to the condenser in which they are condensed to liquid and pass out through the pipe 46 and branches 47 and 48 to either of tanks 49 or 50 depending upon the position of the valves 51 and 52. Each of the alcohol tanks 49 and 50 is connected to the pipe 53 by a branch pipe. In each of these branch pipes there is placed a three way cock 61 and 62 for cutting off the action of the vacuum blower 55, referred to below, from either of the tanks. The three way cocks are also so constructed that they permit the interior of the tanks 49 and 50 to be connected with the atmosphere after the action of the vacuum blower has been cut off from the tanks. Connecting the interior of the tanks 49 and 50 with the atmosphere permits the alcohol contained in the tanks to be readily discharged. The construction, it will be noted, is such that one tank may be filled while the other is discharging. The pipe 53 leads to the buffer tank 54 which in turn leads to the vacuum blower or pump 55 for producing the reduced pressure. The buffer tank is present for the purpose of equalizing the sudden changes produced when changing the various collecting tanks 31 and 32 of the four stills on the vacuum line and when changing the flow of alcohol from either of the tanks 49 and 50. The alcohol accumulating in tanks 49 and 50 is withdrawn through valved pipes 56 and 57. The buffer tank 54 is provided with a valved drain pipe 58 for the purpose of removing accumulations therein. As shown in Fig. 1 the alcohol tanks 49 and 50 and buffer tank 54 are located below the condenser 17 which is supported upon supports indicated generally by 59 and 60 of any suitable construction.

Having described in detail the structure of my apparatus, its operation is as follows: If the flow of one of the lubricating oils or stock is followed the operation of the apparatus disclosed will be readily seen. The flow of the stock passing through still 4 will therefore be taken as illustrative of the operation of all the stills and their connected parts. After preferably cold pressing to remove paraffin, and either with or without being subjected to a treatment to improve its color, the oil is caused to enter the still 4 by means of one of the pipes 12. The oil is heated in the still to a temperature in the neighborhood of 220° F. but not above about 250° F. by means of the steam coil 11. This first heating is preferably not performed under reduced pressure, normal or atmospheric pressure being quite suitable. From the still 4, the oil is passed by means of the pipe 13 to the pump 14 by which it is elevated through the pipe 20 to the top of the vacuum tower 19. the interior of which is maintained under reduced pressure through the action of the pump 55. The oil issues into the interior of the column through the spraying device 21 by which it is minutely divided into a fine spray. This breaks up any union between the oil and the alcohol and the latter under reduced pressure and at the temperature it has attained is released and the vapors thereof pass into the vacuum manifold line 30 and from there into the condenser 17. The liquefied alcohol formed from these vapors is collected in either of the tanks 49 or 50, depending upon the positions of the various valves connected with these tanks. The unvaporized portions of the oil or stock descends through the vacuum tower and may be additionally heated by the steam coil 28 which is used to maintain the temperature and thereby assist the separation of the alcohol. The oil collecting at the base of the vacuum tower, and which is free from alcohol, is led to either of the collecting tanks 31 or 32, depending upon the position of the valves 36, 37, 44 and 45, through the pipes 34 and 35 connected between the vacuum tower and the tanks 31 and 32. The oil accumulating in each of the collecting tanks 31 and 32 is led by suitable pipes 38 and 39 into the storage tank 33. The vapors arising from the stills 4, 5, 6 and 7 are collected in the manifold line 16 and, as indicated above, are condensed within the condenser in a coil or tube system which is independent of the coil or tube system for condensing the vapors arising from the vacuum towers and collected in the manifold line 30. As the oils treated vary in properties, it is obvious that the temperature conditions to be maintained in the stills and the vacuum towers will accordingly vary to some extent as will also the extent of the vacuum in the several vacuum towers. Air, traces of vapors and other gaseous matter uncondensed by the condenser 17 will pass into the vacuum buffer tank 54 and out through the blower or pump 55 into the air.

Having described my invention what I claim is:

1. The process of treating petroleum still residues containing small amounts of alcohol for the purpose of separating the alcohol and petroleum without altering the nature of the petroleum, comprising heating the mixture in the form of a body of liquid at substantially normal pressure to a temperature of from about 220° F. to about 250° F., withdrawing the alcohol vapor therefrom, and thereafter finely dividing the heated mixture while under reduced pressure and withdrawing the final traces of alcohol therefrom in the form of a vapor.

2. The process of treating petroleum still residues containing small amounts of alcohol for the purpose of separating the alcohol and petroleum without altering the nature of the petroleum, comprising heating the mixture in the form of a body of liquid at substantially normal pressure to a temperature of from about 220° F. to about 250° F., withdrawing the alcohol vapor therefrom, and thereafter finely dividing the heated mixture in a heated chamber while under reduced pressure and withdrawing the final traces of alcohol therefrom in the form of a vapor.

3. The continuous process of treating petroleum still residues containing small amounts of alcohol for the purpose of separating the alcohol and petroleum without altering the nature of the petroleum, comprising continuously feeding the mixture into a still and maintaining therein a large body of liquid at substantially normal pressure, while maintaining the temperature of said mixture at from about 220° F. to about 250° F., continuously withdrawing the alcohol vapor from said still, continuously withdrawing said mixture from said still and passing same in finely divided form into a heated chamber while under reduced pressure and withdrawing the final traces of alcohol in the form of a vapor from said mixture.

4. The process of treating petroleum still residues containing small amounts of alcohol for the purpose of separating the alcohol and petroleum without altering the nature of the petroleum, comprising heating the mixture in the form of a body of liquid at substantially normal pressure to a temperature of from about 220° F. to about 250° F., withdrawing the alcohol vapor therefrom, and thereafter finely dividing the heated mixture and maintaining same at from about 220° F. to about 250° F. while under reduced pressure and withdrawing the final traces of alcohol therefrom in the form of a vapor.

In testimony whereof I hereunto affix my signature.

THEODORE A. WERKENTHIN.